(12) United States Patent
Ubik et al.

(10) Patent No.: US 9,491,333 B2
(45) Date of Patent: Nov. 8, 2016

(54) DEVICE FOR RECEIVING VIDEO SIGNALS TRANSMITTED OVER A PACKET COMPUTER NETWORK

(71) Applicant: CESNET, ZÁJMOVÉ SDRUŽENÍ PRÁVNICKÝCH OSOB, Prague (CZ)

(72) Inventors: Sven Ubik, Prague (CZ); Jiri Halak, Mnichovo Hradiste (CZ); Petr Zejdl, Cakovice (CZ)

(73) Assignee: CESNET, zajmove sdruzeni pravnickych osob, Praha (CZ)

( * ) Notice: Subject to any disclaimer, the term of this patent is extended or adjusted under 35 U.S.C. 154(b) by 0 days.

(21) Appl. No.: 14/655,996

(22) PCT Filed: Dec. 17, 2013

(86) PCT No.: PCT/CZ2013/000168
§ 371 (c)(1),
(2) Date: Jun. 26, 2015

(87) PCT Pub. No.: WO2014/101906
PCT Pub. Date: Jul. 3, 2014

(65) Prior Publication Data
US 2015/0373233 A1    Dec. 24, 2015

(30) Foreign Application Priority Data
Dec. 28, 2012  (CZ) ............................... PV 2012-970

(51) Int. Cl.
*H04N 5/08*    (2006.01)
*H04N 21/43*   (2011.01)
*H04N 5/04*    (2006.01)
*H04N 5/44*    (2011.01)

(52) U.S. Cl.
CPC .................. *H04N 5/08* (2013.01); *H04N 5/04* (2013.01); *H04N 5/4401* (2013.01); *H04N 21/4305* (2013.01)

(58) Field of Classification Search
None
See application file for complete search history.

(56) References Cited

U.S. PATENT DOCUMENTS

| 2012/0327302 A1 | 12/2012 | Halák et al. |
| 2013/0268692 A1 | 10/2013 | Williams et al. |

FOREIGN PATENT DOCUMENTS

| WO | Wo 2006/110960 A1 | 10/2006 |
| WO | WO 2011/116735 A2 | 9/2011 |

OTHER PUBLICATIONS

Halak, Jiri et al. "Real-time long-distance transfer of uncompressed 4K video remote collaboration," Future Generation Computer Systems, pp. 886-892.

(Continued)

*Primary Examiner* — Michael Teitelbaum
(74) *Attorney, Agent, or Firm* — Buchanan Ingersoll & Rooney PC

(57) ABSTRACT

The presented invention enables the reception of video signals with variable channel synchronization. All logic elements are located on the receiver side that can work with any transmitter. The receiver comprises one or more sets of modules for image processing. These sets of modules adapt the speed of sending data to the frame generator to the speed of data creation on the transmitter side without the use of a precise time pulse source on both sides of the transfer and without feedback from the receiver to the transmitter. The receiver further includes a memory of channel synchronization configuration which determines the allocation of synchronized channels to groups and the detector of starts of frames. These, along with multiplexers of clock signals, ensure the synchronization of channels within groups and allows for modifying this channel distribution.

4 Claims, 1 Drawing Sheet

(56) References Cited

OTHER PUBLICATIONS

Kitamura, Masahiko et al., "Beyond 4K: 8K 60p live video streaming to multiple sites," Future Generation Computer Systems, pp. 954-959.

International Search Report (PCT/ISA/210) mailed on Mar. 27, 2014, by the Czech Republic Patent Office as the International Searching Authority for International Application No. PCT/CZ2013/000168.

Written Opinion (PCT/ISA/237) mailed on Mar. 27, 2014, by the Czech Republic Patent Office as the International Searching Authority for International Application No. PCT/CZ2013/000168.

Czech Republic Search Report mailed on Sep. 2, 2013.

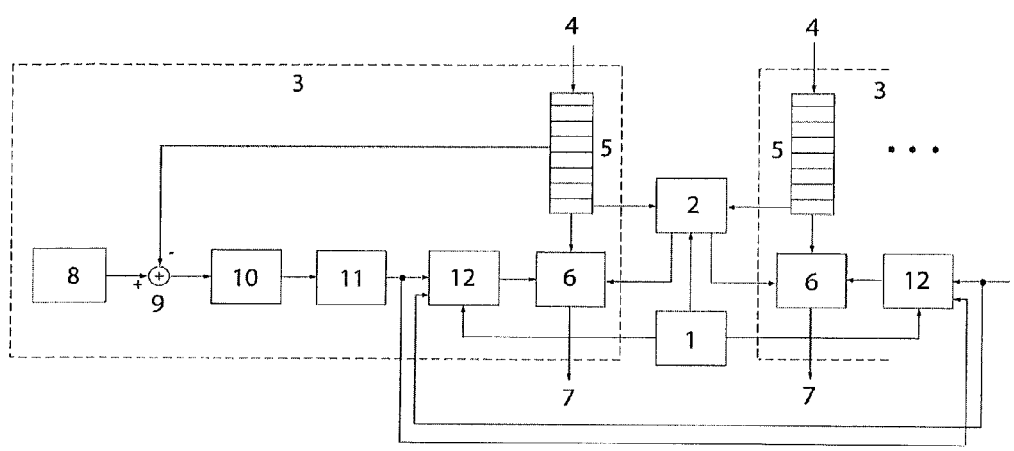

DEVICE FOR RECEIVING VIDEO SIGNALS TRANSMITTED OVER A PACKET COMPUTER NETWORK

FIELD OF THE INVENTION

The presented solution relates to receiving video signals over a packet computer network. It belongs to the area of telecommunication technologies and services.

DESCRIPTION OF THE PRIOR ART

Existing solutions for transmissions of groups of related video signals over a network are limited in the following ways:

The devices are designed for a fixed number of channels in a group, typically two channels for stereoscopic (3D) transmissions or more, as parts of a very high resolution image. For example, four channels in HD resolution (1920× 1080) can be used for images with a resolution of 4K (3940×2160).

All channels in such a group can be synchronized at the output of the receiver by an external source of a synchronization signal using a frame buffer that compensates for the difference in speeds of the transmitter and receiver. Such a solution is described, for example, in the publication of Masahiko Kitamura, et.al.: "Beyond 4K: 8K 60p live video streaming to multiple sites", Future Generation Computer Systems 27 (2011) 952-959, 20 Jan. 2011. The disadvantage is the necessity of occasional frame removals or duplications and extending the time required by image processing.

If it is necessary to ensure a long-term coherence of the receiver speed to the transmitter speed without an external source of a synchronization signal, then both devices usually are connected to sources of a precise time signal. These are typically GPS receivers. Providing the signal from the GPS receiver, which must be placed outside the building, to the place of installation within a building is often technically difficult.

Another possible solution is the common clock synchronization of the transmitter and receiver to the distribution network of precise time by NTP, Network Time Protocol, which is used, for example, in WO 2006110960, or by a similar system. Clock synchronization to a precise time source requires the availability of such a source in the network. Additionally, the synchronization methods used usually require two-way communication, i.e. a feedback between the equipment and the precise time source. Then the device is not functional when using an optical splitter in the incoming signal for replication of the transmitted image.

In addition, the above mentioned solutions also require modifications of both the transmitter and the receiver of the video signal.

There are also known solutions, as described in the article of Jiri Halak, Michal Krsek, Sven Ubik, Petr Žejdl, Felix Nevřela: "Real-time long-distance transfer of uncompressed 4K video for remote collaboration", Future Generation Computer Systems 27 (2011) 886-892, 5 Dec. 2010 or in WO2011116735. These solutions for the coupling of the receiver speed to the transmitter speed did not take into account the possibility of simultaneous transmissions of multiple signals in different formats. A disadvantage of these devices is that they cannot flexibly configure channels to be parts of synchronized groups or to be used as individual channels as needed.

From the above it follows that a system for transmission of video signals with variable channel synchronization and with the coherence of the receiver speed to the transmitter without using an external time or synchronization signal and without a frame buffer is difficult to implement with the current technology.

SUMMARY OF THE INVENTION

The above mentioned disadvantages are overcome by an apparatus for the receiving of video signals with variable channel synchronization according to the presented solution.

The essence of a device for receiving video signals transmitted over a packet computer network is that it comprises a memory of channel synchronization configuration, connected to the configuration input of the detector of starts of frames and at least one set of modules for image packet processing. Each set of modules contains a buffer with a data input. The buffer outputs signalling the line numbers in all sets of modules are connected to corresponding inputs of the detector of starts of frames, where the number of these inputs equals the number of buffers. The data output of each buffer is connected to the data input of the frame generator. The output of the frame generator is the output of the video device. The enabling inputs of frame generators in all sets of modules are connected to the corresponding outputs of the detector of starts of frames. The occupancy signalling output of the buffer is then connected to the inverting input of the differential element, whose non-inverting input is connected to the output of the memory of the required level of occupancy. The output of the differential element is connected to the input of the PID controller, that is the proportional, integral and derivative element, whose output is connected to the control input of the tunable oscillator. The frequency output of the tunable oscillator is connected to the data inputs of multiplexers in all sets of modules. The control inputs of multiplexers in all sets of modules are connected to the corresponding outputs of the memory of channel synchronization configuration. The output of the multiplexer is connected to the clock input of the frame generator.

In one embodiment, video outputs can be in the form of one or more SMPTE 259M (SDI, Serial Digital Interface), and/or SMPTE 292M (HD-SDI) and/or SMPTE424 (3G-SDI) and/or SMPTE 372 (dual-link HD-SDI) channels. In an advantageous embodiment, the receiver modules can be implemented as blocks in a field programmable gate array (FPGA).

The advantage of said device is that all relevant logic circuits are located at the receiver, which can work with any transmitter, which does not need to be modified to ensure the transmission characteristics described herein.

The essential feature of the presented solution is the ability of the receiver to arbitrarily divide the receiving channels into groups with synchronization of channels within each group and to modify this distribution. The synchronization of clock signals for frame generators within a group is ensured by clock signal multiplexers. The vertical synchronization of channels in a group is provided by the detector of starts of frames through enabling inputs of frame generators. The frame generators are suspended until the arrival of the first row of a frame in all channels within the group. The clock signal multiplexers and the detector of starts of frames are controlled by the memory of the channel synchronization configuration.

Another essential feature of the presented solution is the ability of the receiver to continuously adjust the speed of sending data to the frame generators to the speed of data creation at the transmitter side without the use of precise time pulses on both sides of the transfer and without feedback from the receiver to the transmitter. This enables, for example, the use of existing cameras and other real-time video sources which do not support an external clock source. The PID controller operates in the usual manner.

BRIEF DESCRIPTION OF THE DRAWINGS

An example of the embodiment of a device for receiving video signals with variable channel synchronization is schematically shown in the enclosed drawing.

DETAILED DESCRIPTION OF THE PREFERRED EMBODIMENTS

A device for receiving video signals over a packet computer network with variable channel synchronization, whose block diagram is in the enclosed drawing, can be described by the following functional blocks: a memory 1 of channel synchronization configuration, a detector 2 of starts of frames and one or more sets 3 of modules for image processing. Each set 3 of modules for image processing comprises: buffer 5, frame generator 6, memory 8 of the required level of occupancy, differential element 9, PID controller 10, tunable oscillator 11 and clock signal multiplexor 12.

Within each set 3 of modules, data packets with image data come from the computer network to the data input 4 of buffer 5, whose data output is connected to the data input of the frame generator 6 and whose occupancy signalling output is connected to the inverting input of the differential element 9. The non-inverting input of the differential element 9 is connected to the memory 8 of the required level of occupancy. The output of the differential element 9 is connected to the input of the PID controller 10, whose output is connected to the control input of the tunable oscillator 11. The frequency output of the tunable oscillator 11 is connected to inputs of clock signal multiplexers 12 in all sets 3 of modules. The output of the clock signal multiplexer 12 is connected to the clock input of the frame generator 6.

The detector 2 of start of frames has its inputs connected to the outputs signalling the line numbers of the buffer 5 in all sets 3 of modules for image processing and to the memory 1 of channel synchronization configuration. The outputs of the detector 2 of starts of frames are connected to enabling inputs of frame generators 6 in all sets 3 of modules for image processing.

The memory 8 of the required level of occupancy determines the desired average number of video packets to be kept in the buffer 5 for the selected ratio of latency and resilience to packet delay variation (jitter). When the average number of video packets in the buffer 5 differs in the differential element 9 from the contents of the memory 8 of the required level of occupancy, the PID controller 10 will change the frequency of the tunable oscillator 11 to adapt the speed of sending data to the frame generator 6 to the speed of data creation at the transmitter side.

The frame generator 6 converts image data to the format of video outputs 7. The memory 1 of channel synchronization configuration determines which channels are to be mutually synchronized. The detector 2 of starts of frames enables the passing of video packets to frames generators 6 of synchronized channels, once starts of frames in all channels of the group are detected.

Video outputs 7 can be, for example, compliant to the SMPTE 259M (SDI) and/or SMPTE 292M (HD-SDI) and/or SMPTE 424 (3G-SDI) and/or SMPTE 372 (dual-link HD-SDI) standards.

A useful feature of the distribution of video channels into groups with one or more members is the possibility of using each group of video channels for the transmission of a video signal from a separate video source on the transmitter side, wherein these can be, for example, separate video signals at HD or 2K resolution or stereoscopic (3D) signals or signals in very high resolution, for example, 4K, 8K, transmitted in parts in multiple channels.

INDUSTRIAL APPLICABILITY

The described technical solution is industrially very well usable in private, local, national and international computer networks, for real-time transmissions of video signals, for example, for remote interactive access to 3D models in industry, for transmissions of medical procedures or film records at a very high resolution during their processing in post-production, and for their presentation.

The invention claimed is:

1. A device for receiving video signals transmitted over a packet computer network comprising: a memory of channel synchronization configuration connected to the configuration input of the detector of starts of frames and at least one set of modules for image processing, wherein each set of modules is composed of a buffer with data input, wherein the outputs signalling the line numbers of buffers in all sets of modules are connected to corresponding inputs of the detector of starts of frames and the data output of the buffer is connected to the data input of the frame generator, whose output is the video output of the device, while the enabling inputs of frame generators of all sets of modules are connected to the corresponding outputs of the detector of starts of frames, and the buffer has its occupancy signalling output connected to the inverting input of the differential element, whose noninverting input is connected to the output of memory of the required level of occupancy and whose output is connected to the input of the PID controller, which has its output connected to the control input of the tunable oscillator whose frequency output is connected to a data input of multiplexers in all sets of modules and control inputs of multiplexers in all sets of modules are connected to corresponding outputs of memory of channel synchronization configuration, wherein the output of the multiplexer of clock signals is connected to the clock input of the frame generator.

2. The device according to claim 1, wherein the video outputs are formed by one or more channels compliant with at least one of SMPTE259 M, SMPTE292 M, SMPTE424, and SMPTE 372 standards.

3. The device according to claim 1, wherein the receiver modules are implemented as blocks in a field programmable gate array (FPGA).

4. The device according to claim 2, wherein the receiver modules are implemented as blocks in a field programmable gate array (FPGA).

* * * * *